(12) United States Patent
Katyal et al.

(10) Patent No.: US 12,387,006 B2
(45) Date of Patent: Aug. 12, 2025

(54) GENERATING A DYNAMIC ID OF A DEVICE FOR PERSONALIZED APPLICATION DEVELOPMENT AND ENGAGEMENT

(71) Applicant: QUALCOMM Incorporated, San Diego, CA (US)

(72) Inventors: Deepankar Katyal, Seattle, WA (US); Ashok Bhatia, San Diego, CA (US); Kapil Kamra, Sunnyvale, CA (US); Karthik Balasubramanian, San Diego, CA (US); Savipal Soin, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 18/316,808

(22) Filed: May 12, 2023

(65) Prior Publication Data

US 2024/0378319 A1 Nov. 14, 2024

(51) Int. Cl.
*G06F 21/62* (2013.01)
*G06F 21/44* (2013.01)
*G06Q 30/0251* (2023.01)

(52) U.S. Cl.
CPC .......... *G06F 21/6254* (2013.01); *G06F 21/44* (2013.01); *G06Q 30/0269* (2013.01)

(58) Field of Classification Search
CPC .. G06F 21/6254; G06F 21/44; G06F 21/6245; G06Q 30/0269; G06Q 30/0251
See application file for complete search history.

(56) References Cited

U.S. PATENT DOCUMENTS

| | | |
|---|---|---|
| 2011/0010563 A1 | 1/2011 | Lee et al. |
| 2011/0161422 A1 | 6/2011 | Bender et al. |
| 2011/0255688 A1 | 10/2011 | Spalink et al. |
| 2012/0322429 A1 | 12/2012 | Chien |
| 2015/0128285 A1* | 5/2015 | LaFever .............. H04L 63/0414 726/26 |
| 2015/0193828 A1 | 7/2015 | Bulger |
| 2016/0232377 A1 | 8/2016 | Snelling |
| 2019/0036939 A1* | 1/2019 | Johansson ............... H04L 63/10 |
| 2019/0068747 A1* | 2/2019 | Lervik ................. H04L 67/535 |
| 2020/0082290 A1* | 3/2020 | Pascale ................. G06N 20/00 |

OTHER PUBLICATIONS

"Apple's Changes to IDFA in iOS 14", Clearcode, 2020, 23 Pages.
International Search Report and Written Opinion—PCT/US2024/017397—ISA/EPO—May 3, 2024. 12 pages.

* cited by examiner

*Primary Examiner* — Joe Chacko
(74) *Attorney, Agent, or Firm* — Polsinelli LLP

(57) ABSTRACT

Methods that may be performed by a processor of a computing device. Embodiments may include generating general inferences from personal data from the computing device in a manner that disassociates the general inferences from a user identity related to the personal data, coding the general inferences into a dynamic identifier (ID) configured to disassociate the dynamic ID from the user identity related to the personal data, and maintaining the dynamic ID at the computing device for use of the Dynamic ID at the computing device. Embodiments may include making the dynamic ID available for use at the computing device by an advertising software and/or an application developed by an independent software vendor configured to select advertisements at the computing device based on at least one of the general inferences of the dynamic ID.

28 Claims, 8 Drawing Sheets

GENERATING A DYNAMIC ID OF A DEVICE FOR PERSONALIZED APPLICATION DEVELOPMENT AND ENGAGEMENT

BACKGROUND

User privacy and consent regarding data from computing devices that can be collected and inferred is becoming an increasing concern for users, developers, and governments, alike. Data collected from computing devices can include or can be used to infer incredibly specific, accurate, and personal details related to a user. Attempts to anonymize the data collected from the computing devices, such as by removing user identification data, have been shown to be ineffective. Consumers of the data have developed capabilities to infer user identity for anonymized data based on the specific, accurate, and personal nature of the anonymized data. The consumers of the data can build incredibly specific, accurate, and personal profiles for the users related to the data. The data can be used to target the user for advertisement or more nefarious purposes, such as fraud, theft, etc.

SUMMARY

Various aspects include methods and devices performing the methods for enabling use of inferences based on personal data without revealing personal information. Various aspects may include generating general inferences from personal data from the computing device in a manner that disassociates the general inferences from a user identity related to the personal data, coding the general inferences into a dynamic identifier (ID) configured to disassociate the dynamic ID from the user identity related to the personal data; and maintaining the dynamic ID at the computing device for use of the dynamic ID at the computing device. In some aspects, the advertising software may be configured with an algorithm developed with an independent software vendor configured to select advertisements at the computing device based on the at least one of the general inferences of the dynamic ID.

In some aspects, maintaining the dynamic ID at the computing device for use of the Dynamic ID at the computing device may include making the dynamic ID available for use at the computing device by an advertising software configured to select advertisements at the computing device based on at least one of the general inferences of the dynamic ID. In some aspects, maintaining the dynamic ID at the computing device for use of the Dynamic ID at the computing device may include making the dynamic ID available for use at the computing device by an application developed by an independent software vendor configured to select advertisements at the computing device based on at least one of the general inferences of the dynamic ID. In some aspects, maintaining the dynamic ID at the computing device for use of the Dynamic ID at the computing device further may include preventing advertising software from transmitting the dynamic ID from the computing device.

In some aspects, generating the general inferences from the personal data from the computing device in a manner that disassociates the general inferences from the user identity related to the personal data may include generating a persona inference configured to provide general characteristics of the personal data disassociated from the user identity. In some aspects, generating the general inferences from the personal data from the computing device in a manner that disassociates the general inferences from the user identity related to the personal data may include generating at least one characteristic inference configured to provide an abstraction of at least part of the personal data disassociated from the user identity.

Further aspects include a computing device including a processor configured to perform operations of any of the methods summarized above. Further aspects include a computing device including means for performing functions of any of the methods summarized above. Further aspects include a non-transitory processor readable medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
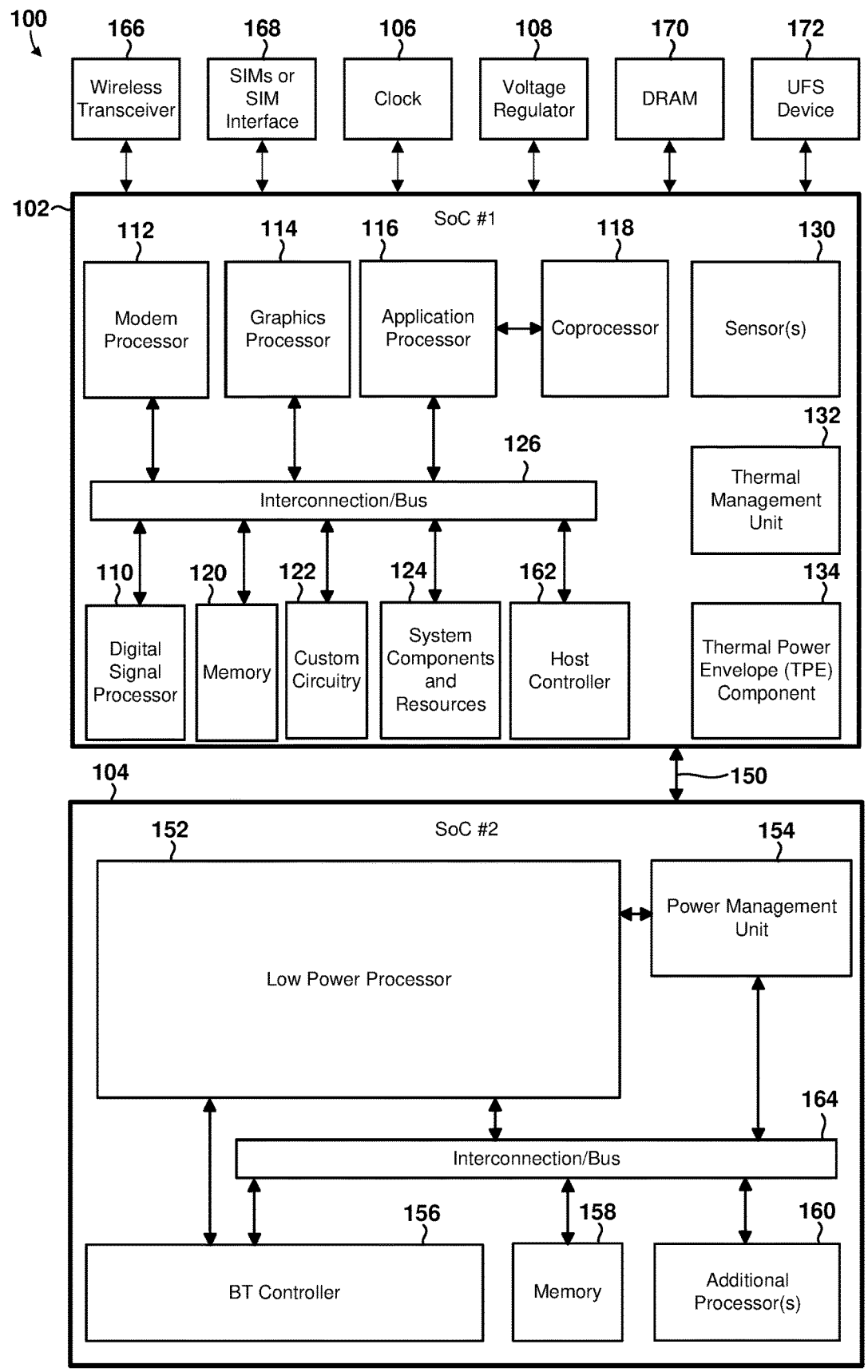
FIG. 1 is a component block diagram illustrating an example computing device suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices for implementing the methods for generating a dynamic identifier (ID) of the computing device for personalized application (app) development and engagement.

Embodiments may include generating general inferences from personal data from a computing device in a manner that disassociates the general inferences from a user identity related to the personal data, coding the general inferences into a dynamic ID configured to disassociate the dynamic ID from the user identity related to the personal data, and maintaining the dynamic ID at the computing device for use of the dynamic ID at the computing device. Embodiments may include making the dynamic ID available for use at the computing device by advertising software and/or an application developed by an independent software vendor configured to select advertisements at the computing device based on at least one of the general inferences of the dynamic ID.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

User privacy and consent regarding data from computing devices that can be collected and inferred is becoming an increasing concern for users, developers, and governments, alike. Data collected from computing devices can include or can be used to infer incredibly specific, accurate, and personal details related to a user. Attempts to anonymize the data collected from the computing devices, such as by removing user identification data, have been shown to be ineffective. Consumers of the data have developed capabilities to infer user identity for anonymized data based on the specific, accurate, and personal nature of the anonymized data. The consumers of the data can build incredibly specific, accurate, and personal profiles for the users related to the data. The data can be used to target the user for advertisement or more nefarious purposes, such as fraud, theft, etc.

Embodiments address and overcome the privacy and consent concerns of use of data collected from computing devices, including anonymized data, by abstracting a dynamic identifier ID from the data collected from the computing device by generating the dynamic ID using general inferences from personal data from the computing device in a manner that disassociates the general inferences from a user identity related to the personal data. The general inferences may be abstractions of one or more characteristics of the personal data from the computing device such that the general inferences do not provide any of the personal data.

For example, a general inference may include a persona inference, which may be an abstraction of a set of personal data from the computing device used to generally characterize a user without providing any of the personal data. As another example, a general inference may include a characteristic inference, which may be an abstraction of a set of personal data from the computing device used to generally characterize a characteristic of the user without providing any of the personal data. The dynamic ID may be a formatted collection of at least one persona inference and/or at least one characteristic inference.

Software executing on the computing device may be configured for providing advertisements on the computing device based on the dynamic ID. Use of the dynamic ID may further protect personal data from the computing device by configuring the software at the computing device to maintain the dynamic ID at the computing device. In some embodiments, native software developed by a processor, operating system, and/or computing device developer for use of the dynamic ID may be configured without a capability of transmitting the dynamic ID from the computing device, including via wireless and/or wired communication transmission, transmission via physical storage media, etc.

In some embodiments, third party software, such as software developed by an independent software vendor, executing on the computing device may be prevented from transmitting the dynamic ID from the computing device, including via wireless and/or wired communication transmission, transmission via physical storage media, etc. In some embodiments, the third part software may be required to be configured without a capability of transmitting the dynamic ID from the computing device, like the native software, to be installed at the computing device. For example, access and/or use of the dynamic ID may be controlled by the native software, which may be integrated into the third party software. In some embodiments, the computing device may include native software configured to prevent third party software from transmitting the dynamic ID from the computing device.

FIG. 1 is a component block diagram illustrating an example computing device 100 suitable for implementing any of the various embodiments. Various embodiments may be implemented on a number of single processor and multiprocessor computer systems, including a system-on-chip (SoC) or system in a package.

With reference to FIG. 1, the illustrated example computing device 100 (which may be a system-in-a-package in some embodiments) includes a two SoCs 102, 104 coupled to a clock 106, a voltage regulator 108, at least one subscriber identity module (SIM) 168 and/or a SIM interface, a dynamic random access memory (DRAM) 170, a Universal FLASH Storage (UFS) device 172, a wireless transceiver 166 configured to send and receive wireless communications via an antenna (not shown) to/from wireless computing devices, such as a base station, wireless device, and/or computing device. In some embodiments, the first SoC 102 may operate as central processing unit (CPU) of the computing device 100 that carries out the instructions of software application programs by performing the arithmetic, logical, control and input/output (I/O) operations specified by the instructions. In some embodiments, the second SoC 104 may operate as a specialized processing unit. For example, the second SoC 104 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 102 may include a digital signal processor (DSP) 110, a modem processor 112, a graphics processor 114, an application processor (AP) 116, one or more coprocessors 118 (e.g., vector co-processor) connected to one or more of the processors, memory 120, custom circuitry 122, system components and resources 124, a host controller 162 for the UFS device 172, an interconnection/bus module 126, one or more sensors 130 (e.g., accelerometer, temperature sensor, pressure sensor, optical sensor, infrared sensor, analog sound sensor, etc.), a thermal management unit 132, and a thermal power envelope (TPE) component 134. The second SoC 104 may include a low power processor 152, a power management unit 154, an interconnection/bus module 164, a BT controller 156, memory 158, and various additional processors 160, such as an applications processor, packet processor, etc.

Each processor 110, 112, 114, 116, 118, 152, 160 may include one or more cores, and each processor/core may perform operations independent of the other processors/cores. For example, the first SoC 102 may include a processor that executes a first type of operating system (e.g., FreeBSD, LINUX, OS X, etc.) and a processor that executes a second type of operating system (e.g., MICROSOFT WINDOWS 10). In addition, any or all of the processors 110, 112, 114, 116, 118, 152, 160 may be included as part of a processor cluster architecture (e.g., a synchronous processor cluster architecture, an asynchronous or heterogeneous processor cluster architecture, etc.).

The first and second SoC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 124 of the first SoC 102 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 124 and/or custom circuitry 122 may also include circuitry to interface with peripheral devices, such as cameras, electronic displays, wireless communication devices, external memory chips, etc.

The first and second SoC 102, 104 may communicate via interconnection/bus module 150. In some embodiments, the interconnection/bus module may be a connection established by transceiving (i.e., receiving and transmitting) components within both the SoC 102 and SoC 104. For example, the low power processor 152 may include a universal asynchronous receiver-transmitter (UART) and the application processor 116 may include a multiple signal messages (MSM) UART driver that is communicatively connected to the UART of the low power processor 152.

The various processors 110, 112, 114, 116, 118, may be interconnected to one or more memory elements 120, system components and resources 124, and custom circuitry 122, and a thermal management unit 132 via an interconnection/bus module 126. Similarly, the low power processor 152 may be interconnected to the power management unit 154, the BT controller 156, memory 158, and various additional processors 160 via the interconnection/bus module 164. The interconnection/bus module 126, 150, 164 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 102, 104 may further include an input/output module (not illustrated) for communicating with resources external to the SoC, such as a clock 106, a voltage regulator 108, one or more wireless transceivers 166, and at least one SIM 168 and/or SIM interface (i.e., an interface for receiving one or more SIM cards), a DRAM 170, a UFS device 172. Resources external to the SoC (e.g., clock 106, voltage regulator 108) may be shared by two or more of the internal SoC processors/cores. The at least one SIM 168 (or one or more SIM cards coupled to one or more SIM interfaces) may store information supporting multiple subscriptions, including a first 5GNR subscription and a second 5GNR subscription, etc.

In addition to the example computing device 100 discussed above, various embodiments may be implemented in a wide variety of computing systems, which may include a single processor, multiple processors, multicore processors, or any combination thereof.

In some embodiments, the various processors of the SoC 102 and SoC 104 may be located within a same SoC. For example, the application processor 116 and low power processor 152 may be located within a same SoC, such as in a single SoC of a wearable device.

Figure 2:
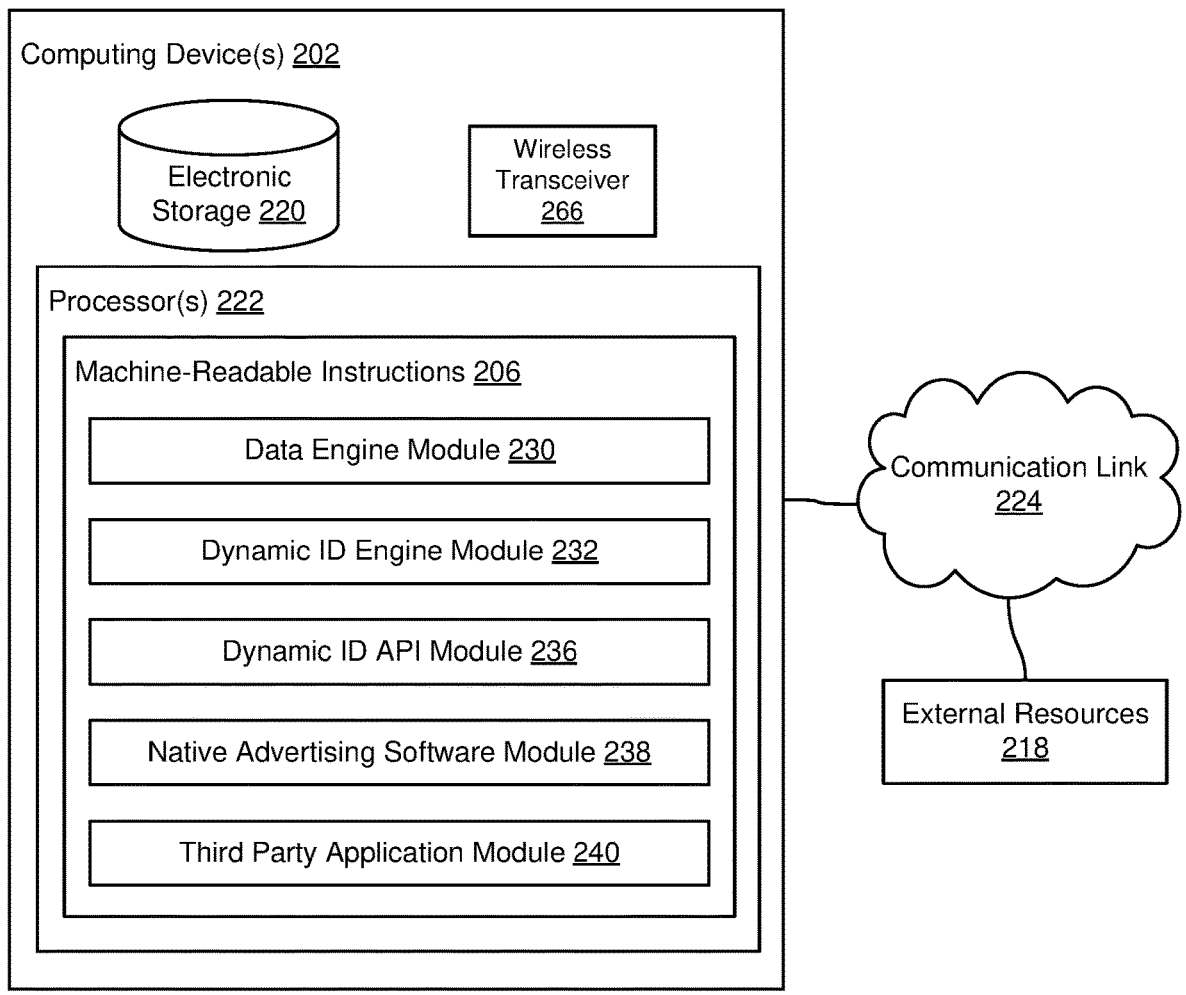
FIG. 2 is a component block diagram illustrating an example system configured to generate a dynamic identifier (ID) of the computing device for personalized app development and engagement according to some embodiments.

FIG. 2 is a component block diagram illustrating an example system 200 configured to generate a dynamic ID of the computing device for personalized app development and engagement according to some embodiments. With reference to FIGS. 1 and 2, the system 200 may include one or more computing device(s) 202 (e.g., computing device 100) and external resources 218, which may communicate via a communication link 224. External resources 218 may include sources of information outside of the system 200, external entities participating with the system 200, or other resources. For example, external resources 218 may be a computing device (e.g., a remote server) that may receive dynamic IDs from the computing devices(s) 202 and transmit advertisements to the computing device(s) 202. In some embodiments, some or all of the functionality attributed herein to external resources 218 may be provided by resources included in the system 200. The system 200 may include a plurality of hardware, software, and/or firmware components operating together to provide the functionality attributed herein to the processor 222 (e.g., SoC 102, processor 110, 112, 114, 116, 118, 152, 160).

The computing device(s) 202 may include electronic storage 220 (e.g., memory 120, DRAM 170, UFS device 172) that may be configured to store information related to functions implemented by a data engine module 230, a dynamic ID engine module 232, a dynamic ID application programming interface (API) module 236, a native advertising software module 238, a third party application module 240, and any other instruction modules.

The electronic storage 220 may include non-transitory storage media that electronically stores information. The electronic storage 220 may include one or both of system storage that is provided integrally (i.e., substantially non-removable) with the system 200 and/or removable storage that is removably connectable to the system 200 via, for example, a port (e.g., a universal serial bus (USB) port, a firewire port, etc.) or a drive (e.g., a disk drive, etc.).

In various embodiments, electronic storage 220 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 220 may include one or more virtual storage resources (e.g., cloud storage, a virtual private network, and/or other virtual storage resources). The electronic storage 220 may store software algorithms, information determined by processor(s) 222, and/or other information that enables the system 200 to function as described herein.

The computing device(s) 202 may be configured by machine-readable instructions 206. Machine-readable instructions 206 may include one or more instruction modules. The instruction modules may include computer program modules. The instruction modules may include one or more of the data engine module 230, the dynamic ID engine module 232, the dynamic ID API module 236, the native advertising software module 238, the third party application module 240, and other instruction modules (not illustrated). The computing device(s) 202 may include processor(s) 222 configured to implement the machine-readable instructions 206 and corresponding modules.

The processor(s) 222 may include one of more local processors that may be configured to provide information processing capabilities in the system 200. As such, the processor(s) 222 may include one or more of a digital processor, an analog processor, a digital circuit designed to process information, an analog circuit designed to process information, a state machine, and/or other mechanisms for electronically processing information. Although the processor(s) 222 is shown in FIG. 2 as a single entity, this is for illustrative purposes only. In some embodiments, the processor(s) 222 may include a plurality of processing units. These processing units may be physically located within the same device, or the processor(s) 222 may represent processing functionality of a plurality of devices distributed in the system 200.

In some embodiments, the processor(s) 222 executing the data engine module 230 may be configured to collect data from the computing device 202. The data engine module 230 may be configured to collect data from systems, subsystems, and/or components of the computing device 202. For example, the data engine module 230 may be configured to collect data processor data from one or more processors 222, location data (e.g., global navigation satellite system (GNSS) data), sensor data from one or more sensors (e.g., sensors 130) (e.g., accelerometer, temperature sensor, pressure sensor, optical sensor, infrared sensor, analog sound sensor, etc. data), one or more application lists, etc. of the computing device 202. The data engine module 230 may be configured to collect raw data from the computing device 202. The data collected from the computing device 202 may include personal data that may enable identification of the computing device 202 itself and/or a user of the computing device 202.

In some embodiments, the processor(s) 222 executing the dynamic ID engine module 232 may generate general inferences from the data collected from the computing device 202 and code the general inferences into a dynamic ID. The dynamic ID engine module 232 generating the general inferences from the data collected from the computing device 202, including personal data, may be configured to disassociate the general inferences from a computing device identity and/or a user identity related to the personal data. The general inferences may be abstractions of one or more characteristics of the data collected from the computing device 202 such that the general inferences do not provide any of the personal data.

For example, a general inference may include a persona inference, which may be an abstraction of a set of personal data from the computing device 202 used to generally characterize a user of the computing device 202 without providing any of the personal data. In some examples, the persona inference may include information relating to location, race, ethnicity, sex, education, employment, activities, etc. without relating to and/or providing identification of the user. As another example, a general inference may include a characteristic inference, which may be an abstraction of a set of personal data from the computing device 202 used to generally characterize a characteristic of the user without providing any of the personal data. In some examples, the characteristic inference may include information relating to habits, abilities, health attributes, computing device usage, etc.

In some examples, the dynamic ID engine module 232 may include standard inference models configured to generate general inferences for any application. In some examples, the dynamic ID engine module 232 may include custom inference models configured by and/or based on requirements from third party developers and configured to generate general inferences for use by the third party developers and/or any application. The dynamic ID engine module 232 may analyze the data collected from the computing device 202, determining which parts of the data to use for generating the general inferences. For example, the dynamic ID engine module 232 may extract parts of the data that are suitable for input to the different inference models.

The dynamic ID may be a formatted collection of the general inferences. For example, the dynamic ID may include at least one persona inference and/or at least one characteristic inference. In some examples, the dynamic ID may be a standard format. For example, the standard format may include general inferences generated using standard inference models. In another example, the standard format may be generated using standard inference models and one or more custom inference models. In some examples, the dynamic ID may be a custom format including the standard format of the dynamic ID augmented to include more and/or other general inferences than provided by the standard format, such as including general inferences generated using standard inference models and one or more custom inference models.

In some embodiments, the processor(s) 222 executing the dynamic ID API module 236 may be configured to control access by software applications to a dynamic ID. For example, the different software applications may have different permissions for different parts of the dynamic ID and access control may be implemented to enable the software applications to read full and/or part of the dynamic ID. In some examples, access control may be implemented by masking general inferences of the dynamic ID for which any software applications do not have permission to access. The software applications may be enabled to use one way GET APIs to access the dynamic ID.

In some embodiments, the processor(s) 222 executing the native advertising software module 238 may fetch the dynamic ID via the dynamic ID API module 236, extract relevant general inferences from the dynamic ID, analyze the relevant general inferences, and fetch advertisements relevant to the dynamic ID. The native advertising software module 238 may be differently configured for different software applications. For example, the native advertising software module 238 may be configured to fetch all and/or part of the dynamic ID for one software application and differently configured to fetch all and/or part of the dynamic ID for another software application, such as by being configured to use differently configured GET APIs.

The native advertising software module 238 may be differently configured, for example, based on interactions with the software application instructing the native advertising software module 238 to fetch all and/or part of the dynamic ID. The native advertising software module 238 may also be differently configured based on interactions with the software application instructing the native advertising software module 238 to extract different relevant general inferences from the dynamic ID, analyze the relevant general inferences, and fetch advertisements relevant to the dynamic ID. Analyzing the relevant general inferences may include evaluating and/or interpreting information of the relevant general inferences for determining which advertisements may correspond to the information of the relevant general inferences. For example, different information of one or a combination of relevant general inferences may correspond with different advertisements. In some embodiments, the native advertising software module 238 may be integrated into the software applications.

In some embodiments, the processor(s) 222 executing the third party application module 240 may interact with the native advertising software module 238, receive the advertisements relevant to the dynamic ID retrieved by the native advertising software module 238, and present the advertisements at the computing device. The third party application module 240 may be the software application interacting with the native advertising software module 238. For example, the third party application module 240 may be configured to instruct the native advertising software module 238 which part of the dynamic ID to retrieve. As another example, the third party application module 240 may be configured to instruct the native advertising software module 238 which part of the dynamic ID to extract and analyze. In some embodiments, the native advertising software module 238 may be integrated into the third party application module 240.

The description of the functionality provided by the different modules 230, 232, 236, 238, 240 is for illustrative purposes, and is not intended to be limiting, as any of modules 230, 232, 236, 238, 240 may provide more or less functionality than is described. For example, one or more of modules 230, 232, 236, 238, 240 may be eliminated, and some or all of its functionality may be provided by other ones of modules 230, 232, 236, 238, 240. As another example, processor(s) 222 may execute one or more additional modules that may perform some or all of the functionality attributed below to one of modules 230, 232, 236, 238, 240.

Figure 3:
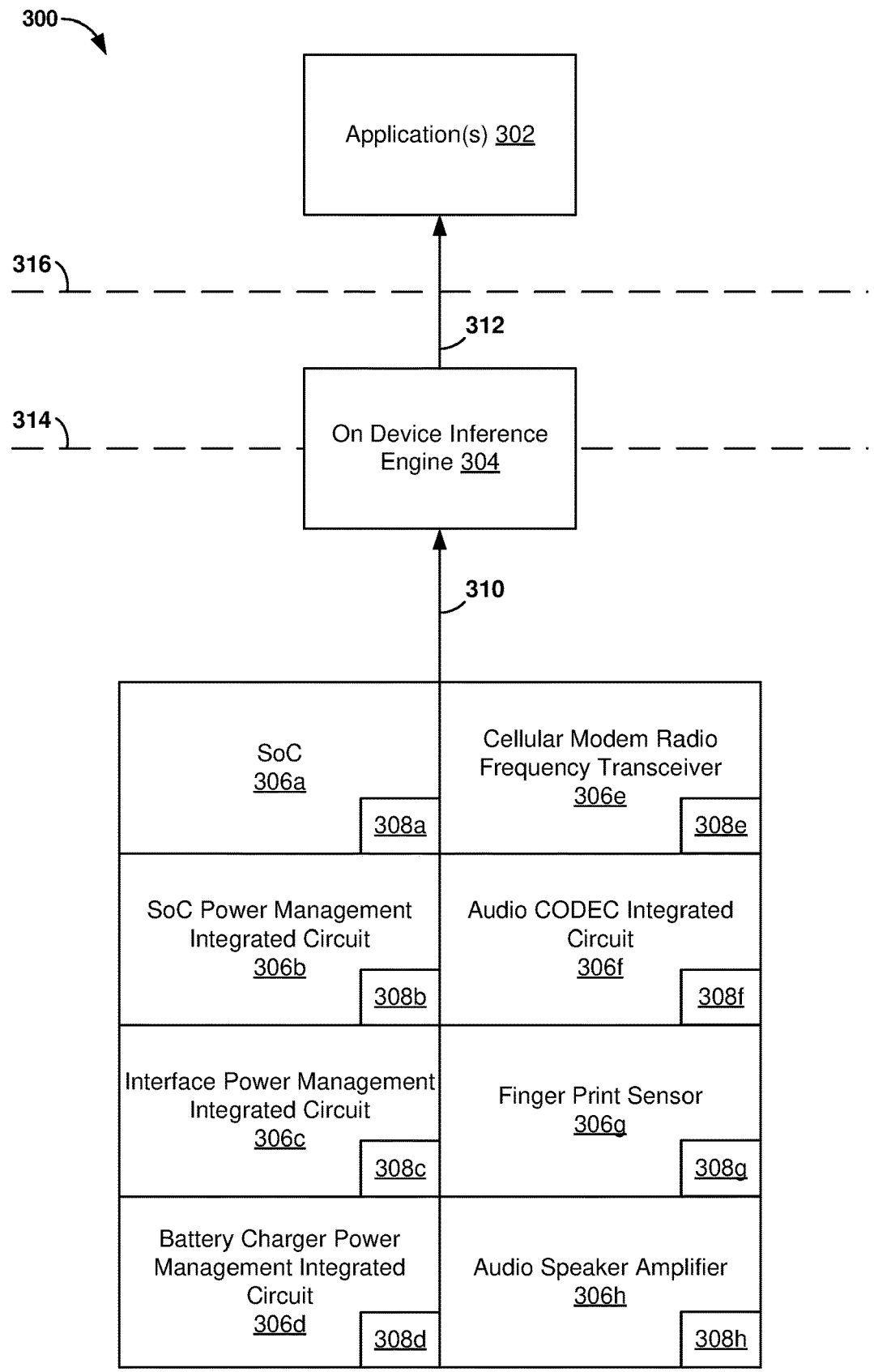
FIG. 3 is a component block diagram illustrating an example computing device configured to generate a dynamic ID of the computing device for personalized app development and engagement according to some embodiments.

FIG. 3 is a component block diagram illustrating an example computing device 300 configured to generate a dynamic ID of the computing device for personalized app development and engagement according to some embodiments. With respect to FIGS. 1-3, the computing device 300 (e.g., computing device 100, computing device 202) may include one or more applications 304, an on-device inference engine 304, and multiple components 306a-306h of the computing device 300 having embedded data collectors 308a-308h.

The components 306a-306h of the computing device 300 may be any components of the computing device for which data 310 collected from the components 306a-306h may be used for generating a dynamic ID 312. For example, the components 306a-306h of the computing device 300 may include components 306a-306h from which location data (e.g., GNSS data), sensor data from one or more sensors (e.g., sensors 130) (e.g., accelerometer, temperature sensor, pressure sensor, optical sensor, infrared sensor, analog sound sensor, etc. data), one or more application lists, etc. of the computing device 300 may be collected by embedded data collectors 308a-308h.

As another example, the components 306a-306h of the computing device 300 may include an SoC 306a (e.g., SoC 102, 104; an integrated access point and baseband SoC), an SoC power management integrated circuit (PMIC) 306b (e.g., voltage regulator 108, TPE component 134, power management unit 154, system components and resources 124), an interface power management integrated circuit 306c (e.g., voltage regulator 108, TPE component 134, power management unit 154, system components and resources 124), a battery charger power management integrated circuit 306d (e.g., voltage regulator 108, system components and resources 124), a cellular modem radio frequency (RF) transceiver 306e (e.g., wireless transceiver 166), an audio CODEC integrated circuit 306f (e.g., system components and resources 124), a fingerprint sensor 306f (e.g., system components and resources 124), and/or an audio speaker amplifier 306h (e.g., system components and resources 124).

The on-device inference engine 304 may include machine-readable instructions (e.g., data engine module 230, dynamic ID engine module 232, dynamic ID API module 236) and may be implemented by a processor (e.g., SoC 102, processor 110, 112, 114, 116, 118, 152, 160, 222). The on-device inference engine 304 may receive the data 310 collected from the components 306a-306h of the computing device 300 via the embedded data collectors 308a-308h. The on-device inference engine 304 may be configured to receive raw data 310 collected from the components 306a-306h of the computing device 300. The data 310 collected from the components 306a-306h of the computing device 300 may include personal data that may enable identification of the computing device 300 itself and/or a user of the computing device 300.

The on-device inference engine 304 may generate general inferences from the data 310 collected from the components 306a-306h of the computing device 300 and code the general inferences into a dynamic ID 312. The data 310 collected from the components 306a-306h of the computing device 300, and the on-device inference engine 304 may be configured to disassociate the general inferences from a computing device identity and/or a user identity related to the personal data. For example, the general inferences may be abstractions of one or more characteristics of the data 310 collected from the components 306a-306h of the computing device 300 such that the general inferences do not provide any of the personal data.

For example, a general inference may include a persona inference, which may be an abstraction of a set of personal data from the computing device 300 used to generally characterize a user of the computing device 300 without providing any of the personal data. In some examples, the persona inference may include information relating to location, race, ethnicity, sex, education, employment, activities, etc. without relating to and/or providing identification of the user. As another example, a general inference may include a characteristic inference, which may be an abstraction of a set of personal data from the computing device 300 used to generally characterize a characteristic of the user without providing any of the personal data. In some examples, the characteristic inference may include information relating to habits, abilities, health attributes, computing device usage, etc.

In some examples, the on-device inference engine 304 may generate general inferences by implementing standard inference models configured to generate general inferences for any application 302. In some examples, the on-device inference engine 304 may generate implementing custom inference models configured by and/or based on requirements from third party developers and configured to generate general inferences for use by the third party developers and/or any application 302. The on-device inference engine 304 may analyze the data 310 collected from the components 306a-306h of the computing device 300, determining which parts of the data 310 to use for generating the general inferences. For example, the on-device inference engine 304 may extract parts of the data 310 that are suitable for input to the different inference models.

The dynamic ID 312 may be a formatted collection of the general inferences. For example, the dynamic ID 312 may include at least one persona inference and/or at least one characteristic inference. In some examples, the dynamic ID 312 may be a standard format. For example, the standard format may include general inferences generated using standard inference models. In another example, the standard format may be generated using standard inference models and one or more custom inference models. In some examples, the dynamic ID 312 may be a custom format including the standard format of the dynamic ID 312 augmented to include more and/or other general inferences than provided by the standard format, such as including general inferences generated using standard inference models and one or more custom inference models.

The dynamic ID 312 may be dynamic in the sense that the dynamic ID 312 may change and/or be updated continuously, periodically, episodically, etc. based on changes in the data 310 collected from the components 306a-306h of the computing device 300 over time. In some examples, the dynamic ID 312 may change and/or be updated using data 310 collected from the components 306a-306h at a point in time and/or cumulatively over a period of time, including up to a first use of the computing device 300, a first use of the computing device 300 by a current user/owner of the computing device 300, a first use of the computing device since a reset of all data at the computing device 300 (e.g., reset to factory settings), etc.

In some embodiments, the on-device inference engine 304 may be configured to control access by the applications 302 to a dynamic ID 312. For example, the different applications 302 may have different permissions for different parts of the dynamic ID 312 and access control may be implemented to enable the applications 302 to read full and/or part of the dynamic ID 312. In some examples, access control may be implemented by masking general inferences of the dynamic ID 312 for which any application 302 does not have permission to access.

The applications 302 may include machine-readable instructions (e.g., native advertising software module 238, third party application module 240) and may be implemented by a processor (e.g., SoC 102, processor 110, 112, 114, 116, 118, 152, 160, 222). The applications 302 may fetch the dynamic ID 312, extract relevant general inferences from the dynamic ID 312, analyze the relevant general inferences, and fetch advertisements relevant to the dynamic ID 312.

The applications 302 may be enabled to use one way GET APIs to access the dynamic ID 312 from the on-device inference engine 304. Any of the applications 302 may be differently configured to fetch all and/or part of the dynamic ID 312 for one application 302 and to fetch all and/or part of the dynamic ID 312 for another application 302, such as by being configured to use differently configured GET APIs. Applications 302 fetching parts of the dynamic ID 312 may fetch different parts of the dynamic ID 312.

The applications 302 may also be differently configured to extract different relevant general inferences from the dynamic ID 312, analyze the relevant general inferences, and fetch advertisements relevant to the dynamic ID 312. Analyzing the relevant general inferences may include evaluating and/or interpreting information of the relevant general inferences for determining which advertisements may correspond to the information of the relevant general inferences. For example, different information of one or a combination of relevant general inferences may correspond with different advertisements. In some embodiments, the applications 302 may receive the advertisements relevant to the dynamic ID 312 and present the advertisement at the computing device 300.

In some embodiments, the applications 302 may include controls over use of the dynamic ID and/or general inferences by the applications 302, such as a by native advertising software module (e.g., native advertising software module 238). In some embodiments, the applications 302 may implement controls as to whether the applications 302 may transmit the dynamic ID and/or general inferences off of the computing device 300, such as by preventing transmission of the dynamic ID and/or general inferences off of the computing device 300.

In some embodiments, the on-device inference engine 304 may reside at a hardware abstraction layer (HAL) and may be configured to bridge communication between hardware and software using a HAL interface definition language (HIDL) 314. In some embodiments, the applications 302 may reside at an application layer and may be configured to communicate with other processes of the computing device 300, such as the on-device inference engine 304, using an Android interface definition language (AIDL) 316.

Figure 4:
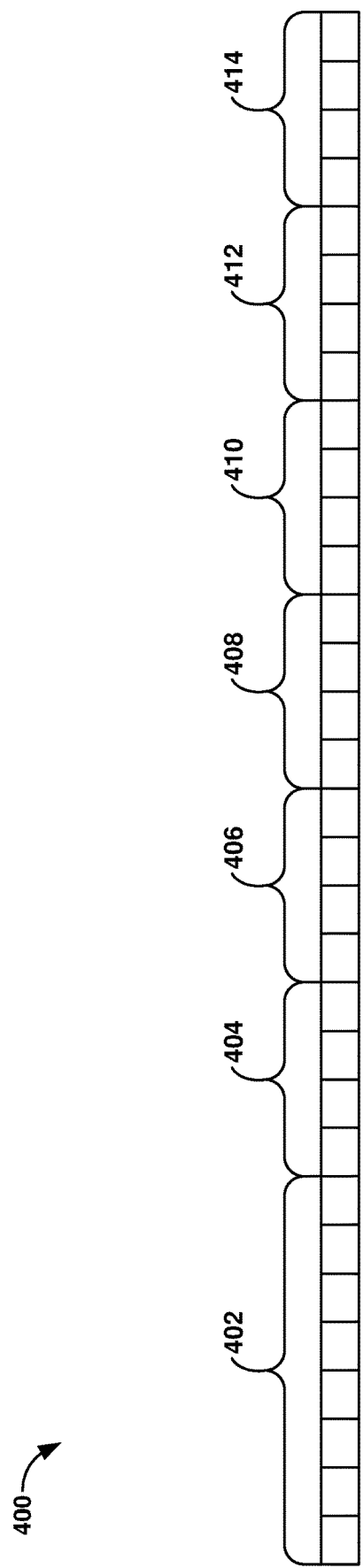
FIG. 4 is a component block diagram illustrating an example dynamic ID the computing device for personalized app development and engagement according to some embodiments.

FIG. 4 is a component block diagram illustrating an example dynamic ID 400 of the computing device for personalized app development and engagement according to some embodiments. With reference to FIGS. 1-4, the dynamic ID 400 (e.g., dynamic ID 312) may include any number of general inferences 402, 404, 406, 408, 410, 412, 414. The dynamic ID 400 may be of any size, such as any number of bits. The general inferences 402, 404, 406, 408, 410, 412, 414 may each be any size, such as any number of bits, and may include any number of uniformly sized and/or differently sized general inferences 402, 404, 406, 408, 410, 412, 414. The dynamic ID 400 and the general inferences 402, 404, 406, 408, 410, 412, 414 illustrated FIG. 4 are a non-limiting example used for ease of explanation and clarity. One of skill in the art would recognize that a dynamic ID and general inferences could be of various configurations, such as sizes, orders, combinations, etc.

In the example illustrated in FIG. 4, the dynamic ID 400 is of a size of 32 bits and includes seven general inferences 402, 404, 406, 408, 410, 412, 414. The general inference 402 is of a size of eight bits, and the general inferences 404, 406, 408, 410, 412, 414 are each of a size of four bits. The general inference 402 may be a persona inference, which may be an abstraction of a set of personal data from a computing device (e.g., computing device 100, 202, 300) used to generally characterize a user of the computing device without providing any of the personal data. The general inferences 404,

406, 408, 410, 412 may be characteristic inferences, which may be abstractions of sets of personal data from the computing device used to generally characterize characteristics of the user without providing any of the personal data. In some embodiments, the dynamic ID 400 of this configuration may be a standard format of a dynamic ID.

In this non-limiting example, the general inference 402, or persona inference, may include information representative of location, activity, person of interest, sensor identification, etc. The general inference 404, or characteristic inference, may include information representative of a driving score for the user. The general inference 406, or characteristic inference, may include information representative of computing device resource consumption of the computing device. The general inference 408, or characteristic inference, may include information representative of a graphics processing unit (GPU0 usage of the computing device. The general inference 410, or characteristic inference, may include information representative of a health score for the user. The general inference 412, or characteristic inference, may include information representative of an ambient score for the environment of the computing device. The general inference 414, or characteristic inference, may include information representative of image processing data of the computing device.

Figure 5:
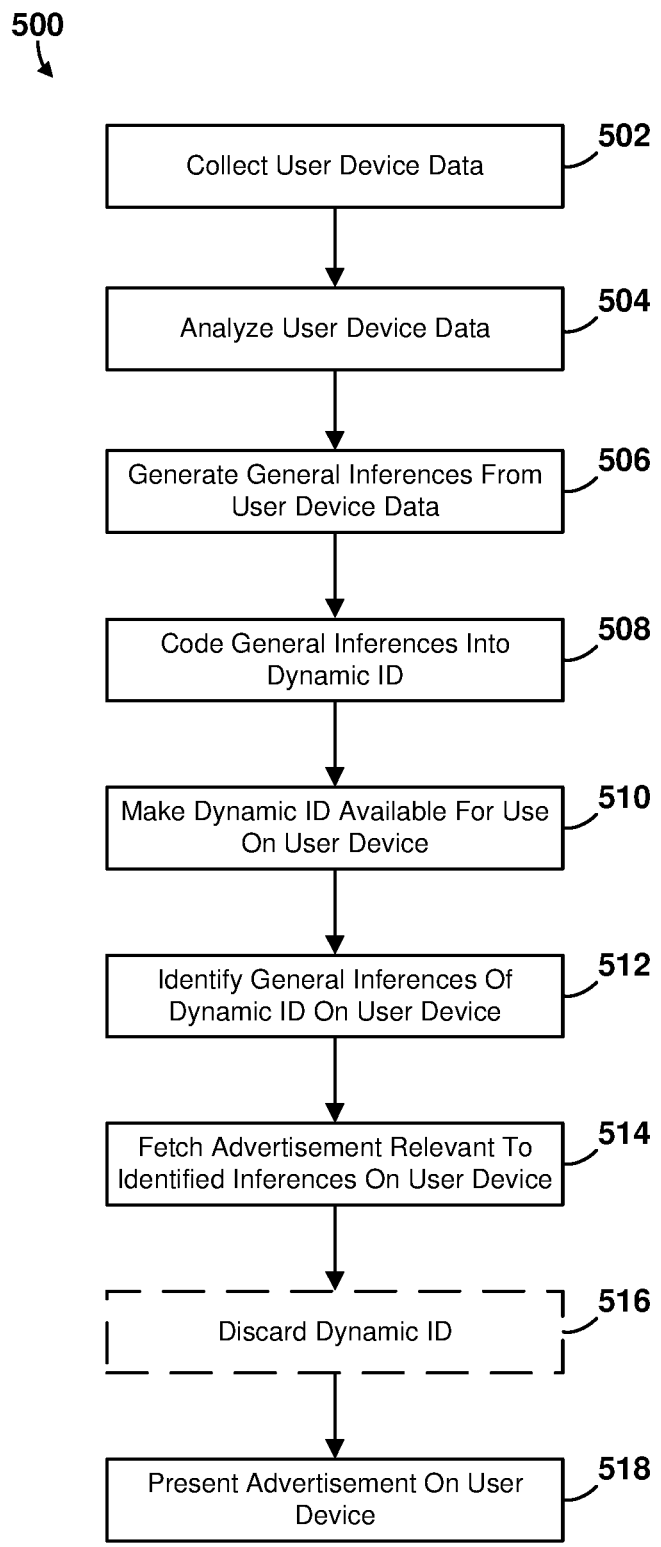
FIG. 5 is a process flow diagram of an example method to generate a dynamic ID of the computing device for personalized app development and engagement in accordance with some embodiments.

FIG. 5 is a process flow diagram of an example method 500 for generating a dynamic ID of a computing device for personalized app development and engagement in accordance with various embodiments. With reference to FIGS. 1-5, the method 500 may be implemented in a computing device (e.g., computing device 100, 202, 300), in software executing in processor (e.g., SoC 102, processor 110, 112, 114, 116, 118, 152, 160, 222), in general purpose hardware, in dedicated hardware (e.g., on-device inference engine 304), or in a combination of a software-configured processor and dedicated hardware, such as a processor (e.g., processor 222) executing software within a system configured to generate a dynamic ID of the computing device for personalized app development and engagement (e.g., system 200) that includes other individual components, and various memory/cache controllers. In order to encompass the alternative configurations enabled in various embodiments, the hardware implementing the method 500 is referred to herein as a "processing device."

In block 502, the processing device may collect user device data. The processing device may receive data (e.g., data 310) collected from the components (e.g., components 306a-306h) of a computing device (e.g., computing device 100, 202, 300). The received data may be raw data collected from the components of the computing device. The data collected from the components of the computing device may include personal data that may enable identification of the computing device itself and/or a user of the computing device. The processing device collecting the user device data in block 502 may include a processor (e.g., SoC 102, processor 110, 112, 114, 116, 118, 152, 160, 222) implementing a data engine module (e.g., data engine module 230) and/or an on-device inference engine (on device inference engine 304).

In block 504, the processing device may analyze the user device data. The processing device may analyze the data collected from the components of the computing device, determining which parts of the data to use for generating the general inferences. For example, the processing device may extract parts of the data that are suitable for input to one or more inference models. The processing device analyzing the user device data in block 504 may include the processor implementing a dynamic ID engine module (dynamic ID engine module 232) and/or the on-device inference engine.

In block 506, the processing device may generate general inferences (e.g., generate general inferences 402-414) from the user device data. The processing device may apply one or more inference models to some or all of the computing device data to generate the general inferences. In some examples, the computing device data may be data collected from the components of the computing device at a point in time and/or cumulatively over one or more periods of time of any duration, including up to a first use of the computing device, a first use of the computing device by a current user/owner of the computing device, a first use of the computing device since a reset of all data at the computing device (e.g., reset to factory settings), etc. In some examples, the processing device may generate general inferences by implementing standard inference models configured to generate general inferences for any application (e.g., application 302). In some examples, the processing device may generate implementing custom inference models configured by and/or based on requirements from third party developers and configured to generate general inferences for use by the third party developers and/or any application. The processing device generating the general inferences from the user device data in block 506 may include the processor implementing the dynamic ID engine module and/or the on-device inference engine.

In block 508, the processing device may code the general inferences into a dynamic ID (e.g., dynamic ID 400). The dynamic ID may be a formatted collection of the general inferences. For example, the dynamic ID may include at least one persona inference and/or at least one characteristic inference. In some examples, the dynamic ID may be a standard format. For example, the standard format may include general inferences generated using the standard inference models. In another example, the standard format may be generated using standard inference models and one or more custom inference models. In some examples, the dynamic ID may be a custom format including the standard format of the dynamic ID augmented to include more and/or other general inferences than provided by the standard format, such as including general inferences generated using the standard inference models and one or more custom inference models. The processing device coding the general inferences into the dynamic ID in block 508 may include the processor implementing the dynamic ID engine module and/or the on-device inference engine.

In block 510, the processing device may make the dynamic ID available for use. For example, the different applications may have different permissions for different parts of the dynamic ID and the processing device may implement access control to enable the applications to read full and/or part of the dynamic ID. In some examples, access control may be implemented by masking general inferences of the dynamic ID for which any application does not have permission to access. The processing device making the dynamic ID available for use in block 510 may include the processor implementing a dynamic ID API module (e.g., dynamic ID API module 236) and/or the on-device inference engine.

In block 512, the processing device may identify general inferences of the dynamic ID on the user device. The processing device identifying the general inferences of the dynamic ID on the computing device in block 512 may include the processor implementing a native advertising software module (e.g., native advertising software module 238), a third party application module (e.g., third party application module 240), and/or an application (e.g., application 302).

The processing device may fetch any combination of all and/or part of the dynamic ID for one or more applications. The processing device may also extract any combination of all and/or some of the relevant general inferences from the dynamic ID for one or more applications. The processing device may analyze the relevant general inferences by evaluating and/or interpreting information of the relevant general inferences for determining which advertisements may correspond to the information of the relevant general inferences. For example, different information of one or a combination of relevant general inferences may correspond with different advertisements.

In some embodiments, the processing device may implement controls over use of the dynamic ID and/or general inferences. In some embodiments, the processing device may implement controls as to whether the transmit the dynamic ID and/or general inferences may be transmitted off of the computing device, such as by preventing transmission of the dynamic ID and/or general inferences off of the computing device.

In block 514, the processing device may fetch an advertisement relevant to the identified general inferences of the dynamic ID on the user device. Based on the analysis if the general inferences of the dynamic ID on the user device in block 512, the processing device may fetch the advertisement corresponding to the information of the relevant general inferences. The processing device may retrieve the advertisements from a memory (e.g., DRAM 170, UFS device 172, electronic storage 220), for example, based on association of the advertisement and a location at the memory. The processing device fetching the advertisement relevant to the identified general inferences of the dynamic ID on the user device in block 514 may include the processor implementing the native advertising software module, the third party application module, and/or the application.

In optional block 516, the processing device may discard the dynamic ID. The processing device may discard by overwriting the dynamic ID in a memory (e.g., memory 120, DRAM 170, UFS device 172, electronic storage 220), invalidating the dynamic ID in the memory, removing address association of the dynamic ID in memory, etc. The processing device discarding the dynamic ID in optional block 516 may include the processor implementing the native advertising software module, the third party application module, and/or the application.

In block 518, the processing device may present the advertisement on the user device. The processing device may display the advertisement via a display device (e.g., screen and/or speaker) of the computing device. The processing device presenting the advertisement on the user device in block 518 may include the processor implementing the native advertising software module, the third party application module, and/or the application.

Figure 6:
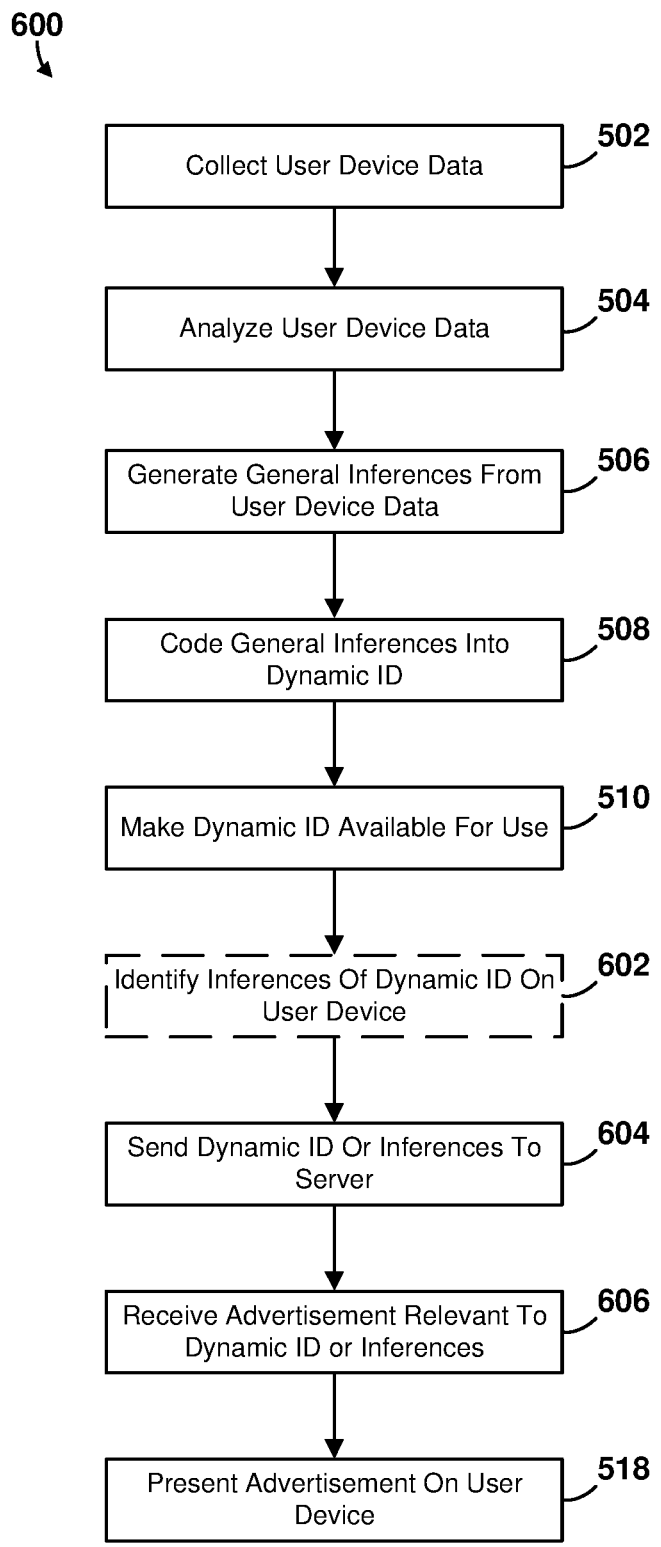
FIG. 6 is a process flow diagram of an example method to generate a dynamic ID of the computing device for personalized app development and engagement in accordance with some embodiments.

FIG. 6 is a process flow diagram of an example method 600 for generating a dynamic ID of a computing device for personalized app development and engagement in accordance with various embodiments. With reference to FIGS. 1-6, the method 500 may be implemented in a computing device (e.g., computing device 100, 202, 300), in software executing in processor (e.g., SoC 102, processor 110, 112, 114, 116, 118, 152, 160, 222), in general purpose hardware, in dedicated hardware (e.g., on-device inference engine 304), or in a combination of a software-configured processor and dedicated hardware, such as a processor (e.g., processor 222) executing software within a system configured to generate a dynamic ID of the computing device for personalized app development and engagement (e.g., system 200) that includes other individual components, and various memory/cache controllers. In order to encompass the alternative configurations enabled in various embodiments, the hardware implementing the method 600 is referred to herein as a "processing device."

Blocks 502, 504, 506, 508, 510, 518 may be implemented for the method 600 in a similar manner as described for blocks 502, 504, 506, 508, 510, 518 of the method 500 with reference to FIG. 5.

In optional block 602, the processing device may identify general inferences (e.g., general inferences 402, 404, 406, 408, 410, 412, 414) of a dynamic ID (e.g., dynamic ID 400) on a user device (e.g., computing device 100, 202, 300). The processing device may fetch any combination of all and/or part of the dynamic ID for one or more applications (e.g., application 302). The processing device may also extract any combination of all and/or some of the relevant general inferences from the dynamic ID for one or more applications. The processing device identifying the general inferences of the dynamic ID in optional block 602 may include a processor (e.g., SoC 102, processor 110, 112, 114, 116, 118, 152, 160, 222) implementing a native advertising software module (e.g., native advertising software module 238), a third party application module (e.g., third party application module 240), and/or an application (e.g., application 302).

In block 604, the processing device may send the dynamic ID and/or identified general inferences to a remote server (e.g., external resource 218). The processing device may send the dynamic ID and/or identified general inferences via a wireless and/or wired communication transmission, such as via an internet connection (e.g., communication link 224), to a remote server. The processing device sending the dynamic ID and/or identified general inferences to the remote server in block 604 may include the processor implementing the native advertising software module, the third party application module, and/or an application, and/or a wireless transceiver (e.g., wireless transceiver 166).

In block 606, the processing device may receive an advertisement relevant to the dynamic ID and/or identified general inferences from the remote server. The remote server may identify the relevant advertisements and transmit the advertisements to the processing device via a wireless and/or wired communication transmission, such as via the internet connection. The processing device receiving the advertisement relevant to the dynamic ID and/or identified general inferences from the remote server in block 606 may include the processor implementing the native advertising software module, the third party application module, and/or an application, and/or the wireless transceiver.

Figure 7:
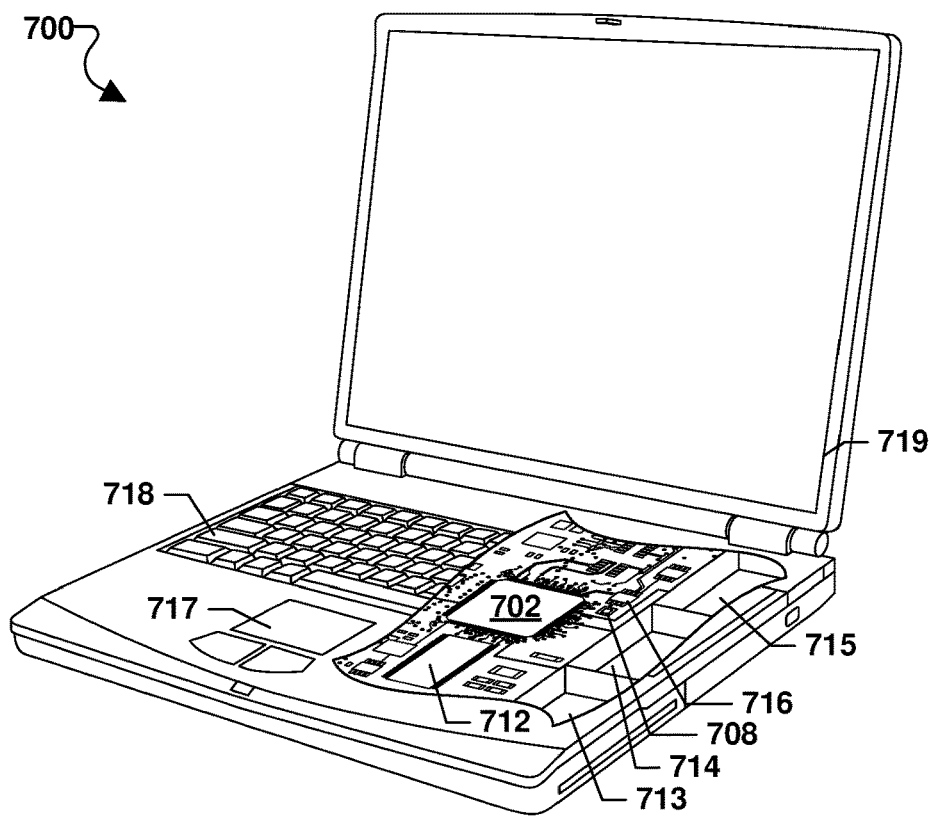
FIG. 7 is a component block diagram illustrating an example computing device suitable for use with the various embodiments.

The various embodiments (including, but not limited to, embodiments described with reference to FIGS. 1-6) may be implemented in a wide variety of computing systems, which may include a laptop computer 700 (e.g., computing device 100, 200, 320), an example of which is illustrated in FIG. 7. With reference to FIGS. 1-7, a laptop computer may include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. The laptop computer 700 may include a touchpad 717, a keyboard 718, and a display 719 all coupled to the processor 702. Other configurations of the computing device may include a computer mouse or trackball coupled to the processor (e.g., via a USB input) as are well known, which may also be used in conjunction with the various embodiments.

Figure 8:
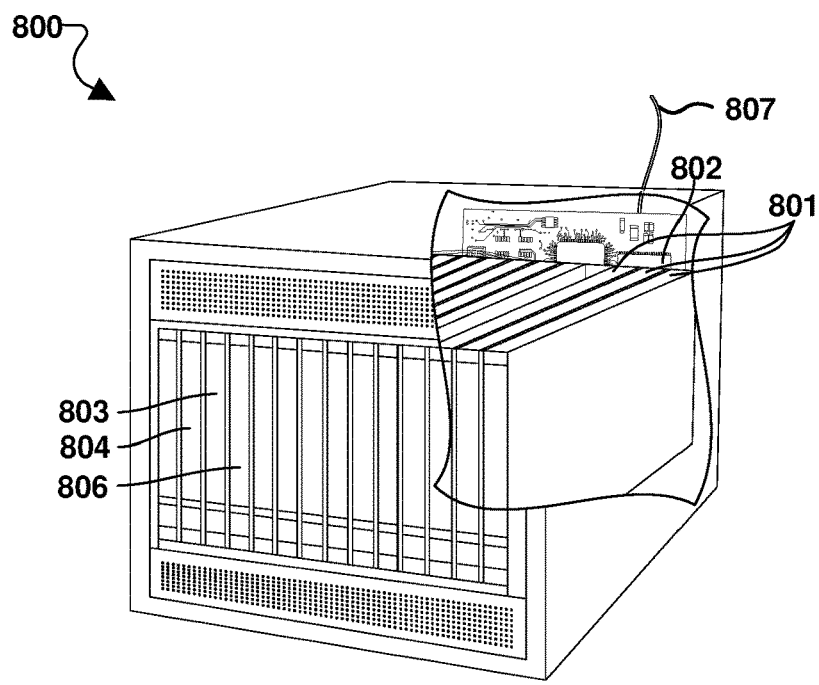
FIG. 8 is a component block diagram illustrating an example server suitable for use with the various embodiments.

FIG. 8 is a component block diagram of a computing device 800, such as a server, suitable for use with various embodiments. Such computing devices may include at least the components illustrated in FIG. 8. With reference to FIGS. 1-8, the computing device 800 (e.g., computing device 100, 200, 320) may include a processor 801 coupled to volatile memory 802 and a large capacity nonvolatile memory, such as a disk drive 803.

The computing device 800 may also include a peripheral memory access device such as a floppy disc drive, compact disc (CD) or digital video disc (DVD) drive 806 coupled to the processor 801. The computing device 800 may also include network access ports 804 (or interfaces) coupled to the processor 801 for establishing data connections with a network, such as the Internet and/or a local area network coupled to other system computers and servers.

The computing device 800 may include one or more antennas 807 for sending and receiving electromagnetic radiation that may be connected to a wireless communication link. The computing device 800 may include additional access ports, such as USB, Firewire, Thunderbolt, and the like for coupling to peripherals, external memory, or other devices.

Figure 9:
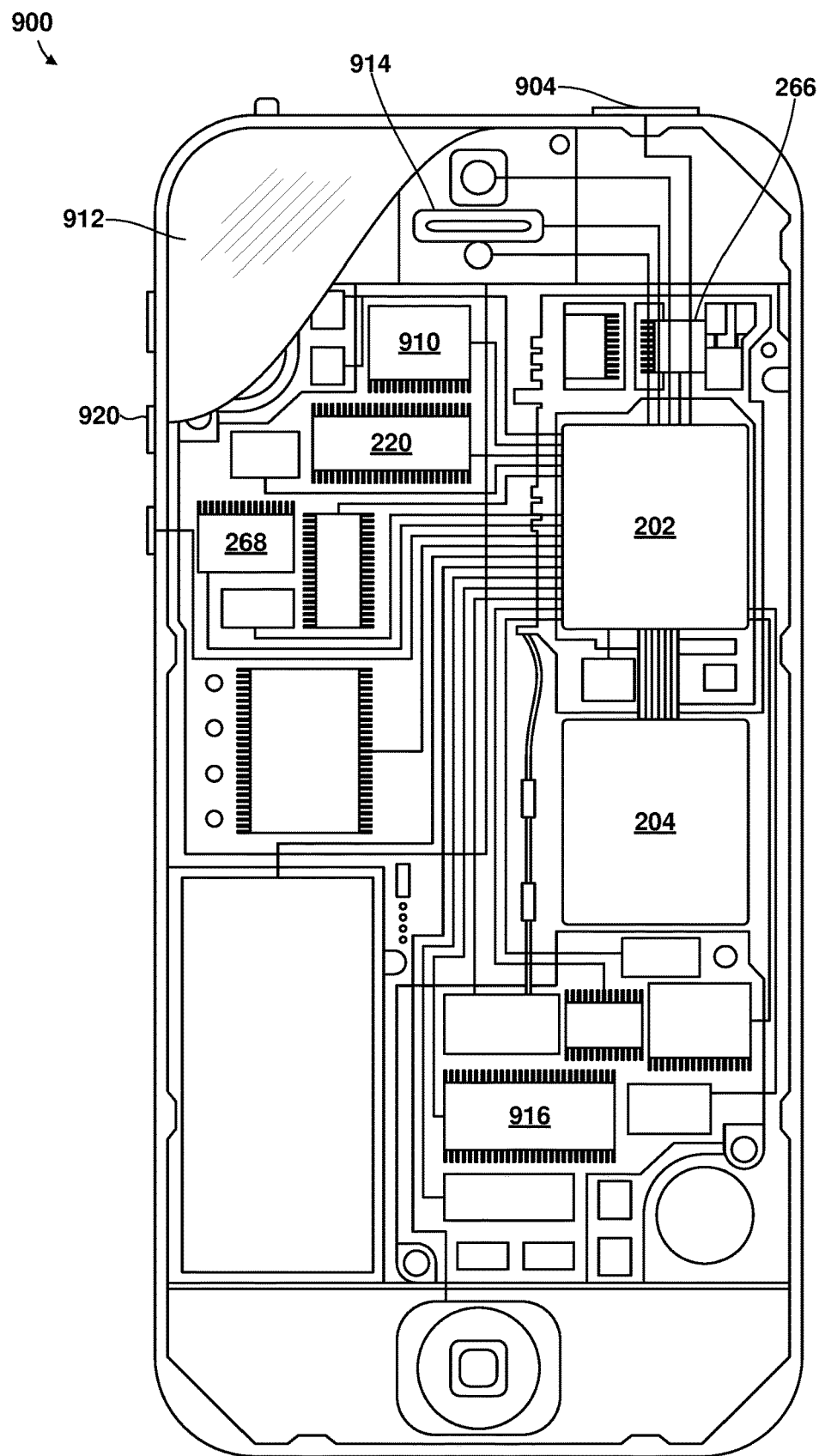
FIG. 9 is a component block diagram illustrating an example wireless communication device suitable for use with the various embodiments.

FIG. 9 is a component block diagram of a computing device 900 suitable for use with various embodiments. With reference to FIGS. 1-9, various embodiments may be implemented on a variety of computing devices 900 (e.g., computing device 100, 200, 320), an example of which is illustrated in FIG. 9 in the form of a smartphone. The computing device 900 may include a first SoC 202 (e.g., a SoC-CPU) coupled to a second SoC 204 (e.g., a 5G capable SoC). The first and second SoCs 202, 204 may be coupled to internal memory 916, a display 912, and to a speaker 914. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 266 coupled to one or more processors in the first and/or second SoCs 202, 204. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 910 may include a digital signal processor (DSP) circuit (not shown separately).

The processors of the computer 700, the computing device 800, and the computing device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 220, 916 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a host controller configured to perform the methods of the following implementation examples; a computing device including means for performing functions of the following implementation examples, a host controller suitable for use in a computing device, in which the host controller includes a processor configured to perform the methods of the following implementation examples; and a non-transitory, processor-readable memory having stored thereon processor-executable instructions configured to cause a host controller in a computing device configured to perform the methods of the following implementation examples.

Example 1. A method performed by a processor of a computing device including: generating general inferences from personal data from the computing device in a manner that disassociates the general inferences from a user identity related to the personal data, coding the general inferences into a dynamic identifier (ID) configured to disassociate the dynamic ID from the user identity related to the personal data; and maintaining the dynamic ID at the computing device for use of the dynamic ID at the computing device.

Example 2. The method of example 1, in which maintaining the dynamic ID at the computing device for use of the Dynamic ID at the computing device includes making the dynamic ID available for use at the computing device by an advertising software configured to select advertisements at the computing device based on at least one of the general inferences of the dynamic ID.

Example 3. The method of example 2, in which the advertising software is configured with an algorithm developed with an independent software vendor configured to select advertisements at the computing device based on the at least one of the general inferences of the dynamic ID.

Example 4. The method of any of examples 1-3, in which maintaining the dynamic ID at the computing device for use of the Dynamic ID at the computing device includes making the dynamic ID available for use at the computing device by an application developed by an independent software vendor configured to select advertisements at the computing device based on at least one of the general inferences of the dynamic ID.

Example 5. The method of example 4, in which maintaining the dynamic ID at the computing device for use of the Dynamic ID at the computing device further includes preventing advertising software from transmitting the dynamic ID from the computing device.

Example 6. The method of any of examples 1-5, in which generating the general inferences from the personal data from the computing device in a manner that disassociates the general inferences from the user identity related to the personal data includes generating a persona inference configured to provide general characteristics of the personal data disassociated from the user identity.

Example 7. The method of any of examples 1-6, in which generating the general inferences from the personal data from the computing device in a manner that disassociates the general inferences from the user identity related to the personal data includes generating at least one characteristic inference configured to provide an abstraction of at least part of the personal data disassociated from the user identity.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), Long Term Evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a computing device, comprising:
    generating general inferences from personal data from the computing device in a manner that disassociates the general inferences from a user identity related to the personal data;
    coding the general inferences into a dynamic identifier (ID), wherein the dynamic ID is disassociated from the user identity related to the personal data;
    maintaining the dynamic ID at the computing device for use of the dynamic ID at the computing device;
    receiving, from a first application of the computing device, a first request to access the general inferences coded into the dynamic ID;
    outputting, based on permissions associated with the first application, a first set of general inferences from the dynamic ID for the first application;
    receiving, from a second application of the computing device, a second request to access the general inferences coded into the dynamic ID; and
    outputting, based on permissions associated with the second application, a second set of general inferences from the dynamic ID for the second application, the second set of general inferences being different from the first set of general inferences.

2. The method of claim 1, wherein maintaining the dynamic ID at the computing device for use of the dynamic ID at the computing device comprises making the dynamic ID available for use at the computing device by an advertising software configured to select advertisements at the computing device based on at least one of the general inferences of the dynamic ID.

3. The method of claim 2, wherein the advertising software is configured with an algorithm developed with an independent software vendor configured to select advertisements at the computing device based on the at least one of the general inferences of the dynamic ID.

4. The method of claim 1, wherein maintaining the dynamic ID at the computing device for use of the dynamic at the computing device comprises making the dynamic ID available for use at the computing device by an application developed by an independent software vendor configured to select advertisements at the computing device based on at least one of the general inferences of the dynamic ID.

5. The method of claim 4, wherein maintaining the dynamic ID at the computing device for use of the dynamic at the computing device further comprises preventing advertising software from transmitting the dynamic ID from the computing device.

6. The method of claim 1, wherein generating the general inferences from the personal data from the computing device in a manner that disassociates the general inferences from the user identity related to the personal data comprises generating a persona inference configured to provide general characteristics of the personal data disassociated from the user identity.

7. The method of claim 1, wherein generating the general inferences from the personal data from the computing device in a manner that disassociates the general inferences from the user identity related to the personal data comprises generating at least one characteristic inference configured to provide an abstraction of at least part of the personal data disassociated from the user identity.

8. A computing device, comprising:
    a memory; and
    processor coupled to the memory and configured to:
        generate general inferences from personal data from the computing device in a manner that disassociates the general inferences from a user identity related to the personal data;
        code the general inferences into a dynamic identifier (ID), wherein the dynamic ID is disassociated from the user identity related to the personal data;
        maintain the dynamic ID at the computing device for use of the dynamic ID at the computing device;
        receive, from a first application of the computing device, a first request to access the general inferences coded into the dynamic ID;
        output, based on permissions associated with the first application, a first set of general inferences from the dynamic ID for the first application;
        receive, from a second application of the computing device, a second request to access the general inferences coded into the dynamic ID; and
        output, based on permissions associated with the second application, a second set of general inferences from the dynamic ID for the second application, the second set of general inferences being different from the first set of general inferences.

9. The computing device of claim 8, wherein the processor is further configured to maintain the dynamic ID at the computing device for use of the dynamic at the computing device by making the dynamic ID available for use at the computing device by an advertising software configured to select advertisements at the computing device based on at least one of the general inferences of the dynamic ID.

10. The computing device of claim 9, wherein the advertising software is configured with an algorithm developed with an independent software vendor configured to select advertisements at the computing device based on the at least one of the general inferences of the dynamic ID.

11. The computing device of claim 8, wherein the processor is further configured to maintain the dynamic ID at the computing device for use of the dynamic at the computing device by making the dynamic ID available for use at the computing device by an application developed by an independent software vendor configured to select advertisements at the computing device based on at least one of the general inferences of the dynamic ID.

12. The computing device of claim 11, wherein the processor is further configured to prevent advertising software from transmitting the dynamic ID from the computing device.

13. The computing device of claim 8, wherein the processor is further configured to generate the general inferences from the personal data from the computing device in a manner that disassociates the general inferences from the user identity related to the personal data by generating a persona inference configured to provide general characteristics of the personal data disassociated from the user identity.

14. The computing device of claim 8, wherein the processor is further configured to generate the general inferences from the personal data from the computing device in a manner that disassociates the general inferences from the user identity related to the personal data comprises generating at least one characteristic inference configured to provide an abstraction of at least part of the personal data disassociated from the user identity.

15. A computing device, comprising:
    means for generating general inferences from personal data from the computing device in a manner that disassociates the general inferences from a user identity related to the personal data;
    means for coding the general inferences into a dynamic identifier (ID), wherein the dynamic ID is disassociated from the user identity related to the personal data;
    means for maintaining the dynamic ID at the computing device for use of the dynamic ID at the computing device;
    means for receiving, from a first application of the computing device, a first request to access the general inferences coded into the dynamic ID;
    means for outputting, based on permissions associated with the first application, a first set of general inferences from the dynamic ID for the first application;
    means for receiving, from a second application of the computing device, a second request to access the general inferences coded into the dynamic ID; and
    means for outputting, based on permissions associated with the second application, a second set of general inferences from the dynamic ID for the second application, the second set of general inferences being different from the first set of general inferences.

16. The computing device of claim 15, wherein means for maintaining the dynamic ID at the computing device for use of the dynamic at the computing device comprises means for making the dynamic ID available for use at the computing device by an advertising software configured to select advertisements at the computing device based on at least one of the general inferences of the dynamic ID.

17. The computing device of claim 16, wherein the advertising software is configured with an algorithm developed with an independent software vendor configured to select advertisements at the computing device based on the at least one of the general inferences of the dynamic ID.

18. The computing device of claim 15, wherein means for maintaining the dynamic ID at the computing device for use of the dynamic at the computing device comprises means for making the dynamic ID available for use at the computing device by an application developed by an independent software vendor configured to select advertisements at the computing device based on at least one of the general inferences of the dynamic ID.

19. The computing device of claim 18, wherein means for maintaining the dynamic ID at the computing device for use of the dynamic ID at the computing device further comprises means for preventing advertising software from transmitting the dynamic ID from the computing device.

20. The computing device of claim 15, wherein means for generating the general inferences from the personal data from the computing device in a manner that disassociates the general inferences from the user identity related to the personal data comprises means for generating a persona inference configured to provide general characteristics of the personal data disassociated from the user identity.

21. The computing device of claim 15, wherein means for generating the general inferences from the personal data from the computing device in a manner that disassociates the general inferences from the user identity related to the personal data comprises means for generating at least one characteristic inference configured to provide an abstraction of at least part of the personal data disassociated from the user identity.

22. A non-transitory processor-readable medium having stored thereon processor-executable instructions configured to cause a processor of a computing device to perform operations comprising:
    generating general inferences from personal data from the computing device in a manner that disassociates the general inferences from a user identity related to the personal data;
    coding the general inferences into a dynamic identifier (ID), wherein the dynamic ID is disassociated from the user identity related to the personal data;
    maintaining the dynamic ID at the computing device for use of the dynamic ID at the computing device;
    receiving, from a first application of the computing device, a first request to access the general inferences coded into the dynamic ID;
    outputting, based on permissions associated with the first application, a first set of general inferences from the dynamic ID for the first application;
    receiving, from a second application of the computing device, a second request to access the general inferences coded into the dynamic ID; and
    outputting, based on permissions associated with the second application, a second set of general inferences from the dynamic ID for the second application, the second set of general inferences being different from the first set of general inferences.

23. The non-transitory processor-readable medium of claim 22, wherein the stored processor-executable instructions are configured to cause the processor of the computing device to perform operations such that maintaining the dynamic ID at the computing device for use of the dynamic at the computing device comprises making the dynamic ID available for use at the computing device by an advertising software configured to select advertisements at the computing device based on at least one of the general inferences of the dynamic ID.

24. The non-transitory processor-readable medium of claim 23, wherein the advertising software is configured with an algorithm developed with an independent software vendor configured to select advertisements at the computing device based on the at least one of the general inferences of the dynamic ID.

25. The non-transitory processor-readable medium of claim 22, wherein the stored processor-executable instructions are configured to cause the processor of the computing device to perform operations such that maintaining the dynamic ID at the computing device for use of the dynamic at the computing device comprises making the dynamic ID available for use at the computing device by an application developed by an independent software vendor configured to select advertisements at the computing device based on at least one of the general inferences of the dynamic ID.

26. The non-transitory processor-readable medium of claim 25, wherein the stored processor-executable instructions are configured to cause the processor of the computing device to perform operations such that maintaining the dynamic ID at the computing device for use of the dynamic at the computing device further comprises preventing advertising software from transmitting the dynamic ID from the computing device.

27. The non-transitory processor-readable medium of claim 22, wherein the stored processor-executable instructions are configured to cause the processor of the computing device to perform operations such that generating the general inferences from the personal data from the computing device in a manner that disassociates the general inferences from the user identity related to the personal data comprises generating a persona inference configured to provide general characteristics of the personal data disassociated from the user identity.

28. The non-transitory processor-readable medium of claim 22, wherein the stored processor-executable instructions are configured to cause the processor of the computing device to perform operations such that generating the general inferences from the personal data from the computing device in a manner that disassociates the general inferences from the user identity related to the personal data comprises generating at least one characteristic inference configured to provide an abstraction of at least part of the personal data disassociated from the user identity.

* * * * *